Nov. 28, 1944.  H. O. KIRKPATRICK  2,363,974
MOUNTING FOR REFRIGERATING APPARATUS AND THE LIKE
Filed Aug. 2, 1943  2 Sheets-Sheet 1
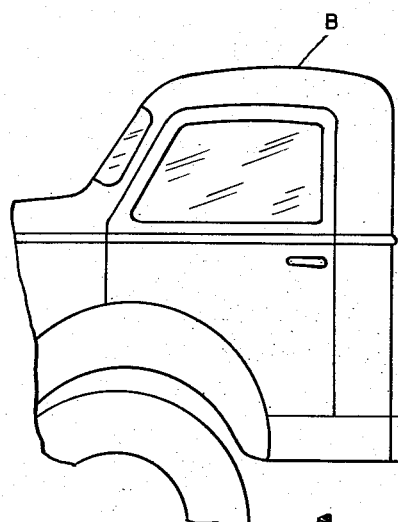
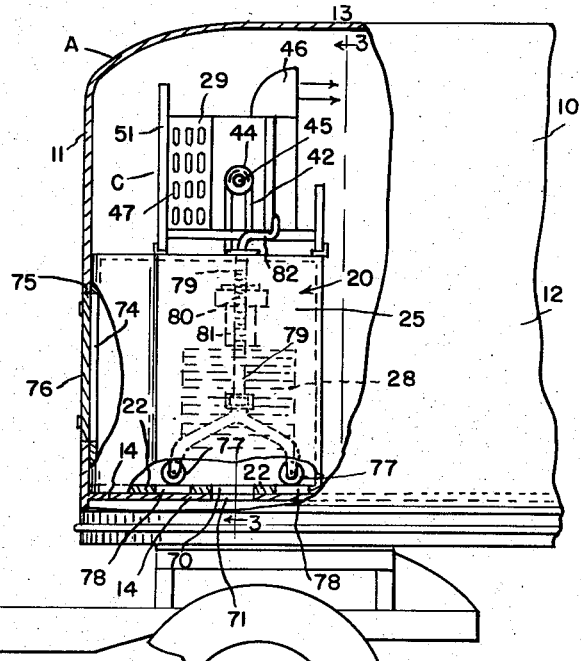
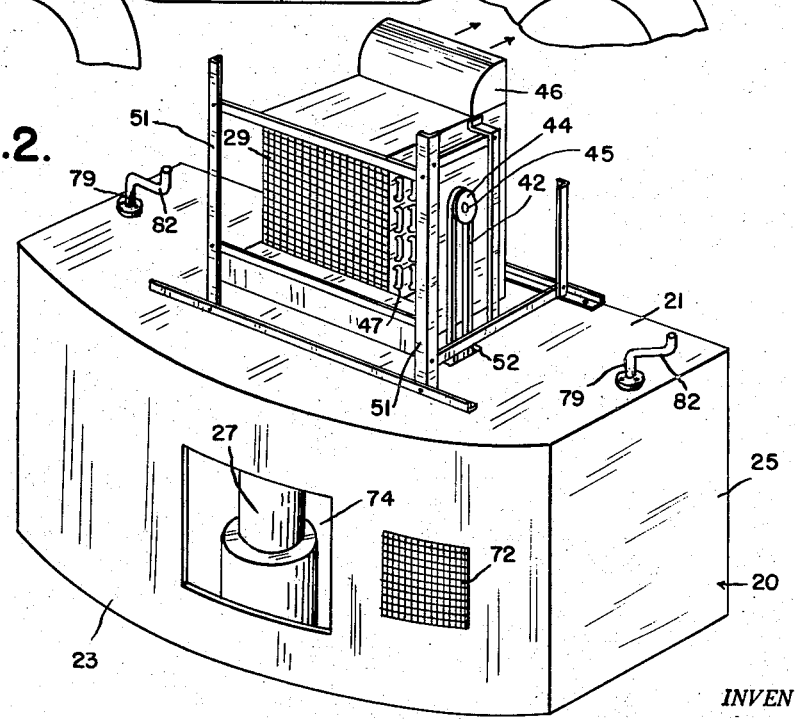
INVENTOR.
HENRY O. KIRKPATRICK
BY
*Whittemore, Hulbert & Belknap*
ATTORNEYS Nov. 28, 1944.        H. O. KIRKPATRICK        2,363,974

MOUNTING FOR REFRIGERATING APPARATUS AND THE LIKE

Filed Aug. 2, 1943        2 Sheets-Sheet 2

INVENTOR.
HENRY O. KIRKPATRICK
BY
ATTORNEYS.

Patented Nov. 28, 1944

2,363,974

UNITED STATES PATENT OFFICE 2,363,974

MOUNTING FOR REFRIGERATING APPARATUS AND THE LIKE

Henry O. Kirkpatrick, Detroit, Mich., assignor, by mesne assignments, to Advance Manufacturing, Incorporated, Detroit, Mich., a corporation of Michigan Application August 2, 1943, Serial No. 497,076

17 Claims. (Cl. 62—129)

This invention relates generally to air conditioning apparatus and refers more particularly to portable apparatus adapted to be removably installed in vehicles of the closed type such as enclosed trailers, freight cars and the like for maintaining the air within such vehicles at the proper temperature regardless of outside temperatures to protect perishable foods and other loads that otherwise might be affected by outside temperature changes.

Heretofore, as in Sunday 2,263,476, dated November 18, 1941, means has been provided for conditioning the interior of closed vehicles, however such apparatus was not portable and was not designed to be completely installed within the vehicle.

In the present instance the apparatus is not only portable and capable of being completely installed as a self-contained unit within the vehicle but is lighter and more compact so hundreds of pounds may be saved for pay loads. Moreover, registering openings are provided in the unit casing and the body of the vehicle through which air may be drawn and exhausted to dissipate heat from the power plant such as an internal combustion engine and from the compressor and condenser of the apparatus. Provision is also made in the unit casing and vehicle body to permit the apparatus to be readily serviced from the outside of the vehicle while the body is being loaded and without the necessity of removing any of the load. In addition, the apparatus is provided with wheeled supports capable of being conveniently and easily adjusted relative to the unit to raise and lower the unit relative to the floor of the vehicle in which it is installed, so that the unit may be easily rolled over the floor of the vehicle when it is desired to install the unit in or remove it from the vehicle. Preferably these supports are constructed and arranged in such a way that they may be raised to an inoperative position when the unit reaches its operative position and may be lowered into supporting engagement with the floor of the vehicle when it is desired to move the unit from one position to another. Thus, the unit may be bodily removed when there is no further need for it over a prolonged period of time, or whenever it is desired to overhaul the apparatus at the factory or other service station, or to substitute or replace units in a given vehicle. Thus, a unit of one size or capacity may be replaced by a unit of different size or capacity, as desired.

It should also be noted that the apparatus is entirely independent of the tractor, truck or other power driven hauling means for the trailer. It is also independent of the chassis or ground engaging wheels and axles of the vehicle in which it is installed. In fact, it has its own power plant. This and other factors enables the apparatus to be located in an out of the way place within the vehicle. Preferably the configuration of the unit is such that it may be nested against the front wall of the vehicle body where it will be away from the usual loading and unloading openings or doors of the vehicle and will permit the vehicle to carry a maximum pay load.

In view of the foregoing it will be apparent that one of the essential objects of the present invention is to provide an improved apparatus of the type mentioned.

Another object is to provide an apparatus that is simple in construction, comparatively inexpensive to manufacture, and efficient in operation.

Other objects, advantages and novel details of construction of this invention will be made more apparent as this description proceeds, especially when considered in connection with the accompanying drawings, wherein:

Figure 1 is a fragmentary side elevation of a truck trailer combination with parts broken away and in section and showing an air conditioning unit embodying my invention located within the body of the trailer at the forward end thereof;

Figure 2 is a perspective view of the air conditioning unit;

Figure 3:
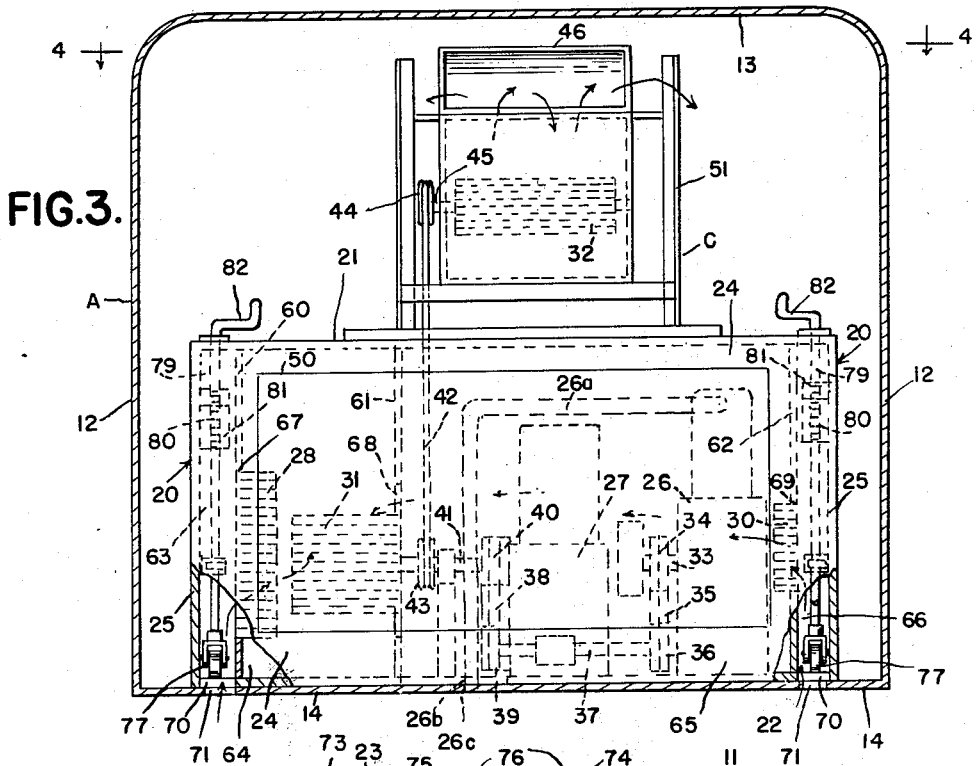
Figure 3 is a vertical transverse sectional view taken substantially on the line 3—3 of Figure 1.
Figure 4:
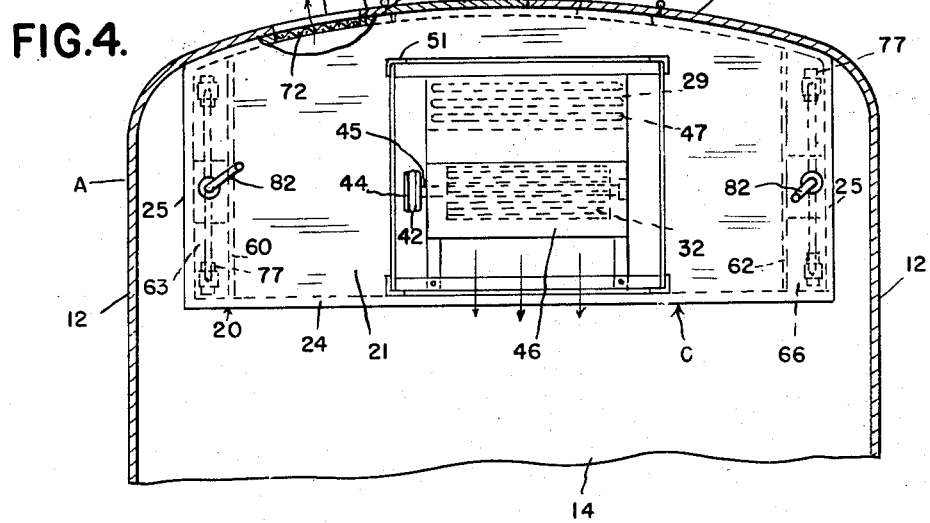
Figure 4 is a horizontal sectional view taken substantially on the line 4—4 of Figure 3.

Referring now to the drawings, A is a cargo type trailer of the closed type, B is a truck for hauling the trailer, and C is an apparatus embodying my invention.

As shown, the trailer A is coupled to the truck B and has an elongated body 10 provided with front, side, top and bottom walls 11, 12, 13 and 14 respectively. As usual the body 10 of the trailer is provided at its rear end with one or more openings (not shown) through which it may be loaded and unloaded, and such openings are provided with suitable doors (not shown). However, the loading and unloading openings may be in one or both side walls 12 of the trailer body intermediate the ends thereof if desired.

The apparatus C for conditioning the interior of the trailer A is a self-contained portable unit and is located within the trailer at the forward end thereof. Preferably this unit has a casing or housing 20 provided with top, bottom, front, rear and side walls 21, 22, 23, 24 and 25 respectively, and includes a gasoline motor or internal combustion engine 26, a refrigerant compressor 27, condenser 28, and evaporator 29. In the present instance the parts just mentioned may be any approved type or construction for handling a suitable refrigerant such as sulphurous acid (SO₂), sulphur dioxide, ethyl chloride, methyl chloride, etc. However, the engine 26 preferably has an exhaust pipe 26a for conducting the exhaust gases from the engine downwardly through registering openings 26b and 26c in the bottom walls 22 and 14 respectively of the casing 20 and vehicle body to the exterior of the latter.

Preferably the drive from the engine 26 to the compressor 27 and to suitable fans or blowers 30, 31 and 32 respectively for the engine 26, condenser 28 and evaporator 29 may be any suitable construction. For example the engine 26 may have a drive shaft 33 carrying one or more pulleys 34 operatively connected by belts 35 to one or more pulleys 36 on a shaft 37 from which the piston (not shown) in the compressor 27 may be driven. The drive shaft 33 may also carry the fan or blower 30 for the engine 26. One or more belts 38 may be used to operatively connect pulleys 39 on the shaft 37 to pulleys 40 on a shaft 41 for driving the fan 31 for the condenser 28, while one or more belts 42 may be used to operatively connect pulleys 43 on the shaft 41 to one or more pulleys 44 on a shaft 45 for driving the fan 32 for the evaporator 29.

Preferably the evaporator 29 has a hood 46 for directing rearwardly within the trailer the air that is cooled by the coils 47 of the evaporator.

Any suitable means such as a system of conduits (not shown) may be employed for conducting the refrigerant from the compressor 27 to the condenser 28 and evaporator 29 and thence back to the compressor, and any suitable means (not shown) such as a liquid receiver and an expansion valve may be employed in the conduit system as usual for receiving the refrigerant during its travel from the condenser 28 to the evaporator 29. Likewise, any suitable means (not shown) such as a cross-over valve structure similar to that shown in Sunday 2,263,476 or some other suitable means (not shown) may be employed in the conduit system mentioned for reversing the cycle of the refrigerant so that the evaporator 29 will receive the refrigerant in gaseous form from the compressor 27 and thus will function as a condenser to deliver warm air instead of cool air within the body of the trailer.

Preferably the engine 26, compressor 27, condenser 28, fan 31 and associated parts are located within the casing 20 and are accessible through a normally closed opening 50 in the rear wall 24 of said casing, while the evaporator 29, fan 32 and associated parts are mounted on top of said casing 20. More specifically, the engine 26 and compressor 27 are supported upon the bottom wall or floor 22 of the casing, while the evaporator 29 and fan 32 are supported by angle irons 51 on the top wall 21 of the casing. An opening 52 in the top wall 21 of the casing receives the belt or belts 42 employed for driving the fan 32.

Within the casing 20 are three partitions 60, 61 and 62 respectively, that are substantially parallel to and cooperate with the walls of the casing to form compartments or chambers 63, 64, 65 and 66 respectively. The partition 60 has an opening 67 that registers with the condenser 28; the partition 61 has an opening 68 that receives the fan 31; and the partition 62 has an opening 69 that receives the fan 30.

The bottom wall or floor 22 of the casing 20 has openings 70 that register with similar openings 71 in the bottom wall or floor 14 of the vehicle body when the unit is installed to permit air from the atmosphere to enter the chambers 63 and 66 respectively. The fan 31 will draw air upwardly through the registering openings 70 and 71 and will cause such air to pass downwardly through the coils of the condenser 28 to cool the same. The fan 30 will draw air upwardly through the registering openings 70 and 71 and will cause such air to pass around the engine 26 and compressor 27 to cool the same. After cooling the condenser 28, engine 26 and compressor 27 respectively, the air from the registering inlets mentioned will be exhausted by the fans 31 and 30 through a screened outlet 72 in the front wall 23 of the casing 20 that registers with an opening 73 in the front wall 11 of the vehicle body when the unit is installed.

To permit the apparatus to be serviced after it is installed, there is an opening 74 in the front wall 23 of the casing 20 that registers with an opening 75 in the front wall 11 of the vehicle body. Suitable doors 76 carried by the vehicle body are employed to normally close the opening 75. Thus, the apparatus may be serviced from the outside of the vehicle body without disturbing the load within the vehicle body.

In order that the unit may be readily moved to and from its operative position at the front end of the vehicle body, I have provided such unit with wheels or rollers 77 that are engageable with the bottom wall or floor 14 of the vehicle body. Preferably, these rollers 77 are movable vertically through openings 78 in the bottom wall or floor 22 of the casing to and from supporting engagement with the floor 14 of the vehicle body. Any suitable mechanism such as the crank operated shafts 79 may be employed to raise and lower the rollers 77. As shown, these shafts 79 have threaded portions 80 engaging suitable brackets 81 rigid with the side walls 25 of the casing. The rollers 77 are carried by the lower ends of these shafts, while the cranks 82 are at the upper ends thereof and are accessible above the top wall 21 of the casing. Thus, by lowering the rollers 77 through the openings 78 into operative engagement with the floor 14 of the vehicle body the unit may be raised relative to said floor and rolled over the same to and from its operative position at the front end of the vehicle body. When the unit is in its operative lowered position the rollers 77 are raised in the openings 78, hence the bottom wall 22 of the casing 20 will lie flat upon the bottom wall 14 of the vehicle body; the openings 70 in the bottom wall 22 of the casing will register with the openings 71 in the floor 14 of the vehicle; the outlet 72 will register with the opening 73; and the opening 74 will register with the opening 75, as aforesaid. Any suitable means (not shown) such as screws, bolts and the like may be employed to hold the unit in place. Such fastening elements may engage the bottom walls 22 and 14 respectively of the casing and vehicle body to hold the unit down as well as against the front wall 11 of the vehicle body. In this connection the front wall 23 of the casing is preferably transversely curved to conform in shape to and be nested in surface to surface relation against the curved front wall or nose 11 of the vehicle body.

In the present instance the casing or housing 20 may be formed of insulating material so that heat from the engine 26, compressor 27 and condenser 28 will not leak into the vehicle body. Any suitable material may be employed for this purpose.

It is also contemplated that the hand valves or other controls (not shown) for the apparatus will be provided with extensions that will project through and be accessible from the outside of the vehicle body so that the apparatus may be defrosted or otherwise controlled and regulated from the outside of the vehicle body after the unit is installed. Likewise, an oil level sight glass, an oil filler pipe, and oil drains (not shown) may be on the outside of the vehicle body and operatively connected to the apparatus when installed. A gasoline or fuel tank (not shown) for the engine may be located within the casing 20 and may have its filler pipe (not shown) extend through and be accessible from the outside of the vehicle body. Also an electric switch (not shown) to start and stop the apparatus may be on the outside of the vehicle body and operatively connected to the apparatus within the casing 20.

Thus, from the foregoing it will be apparent that no refrigerating skill or specialist is necessary to install the unit in the vehicle body. Such unit may be installed or removed very easily by the customer. If a customer has enough units in use he may carry spare units in stock so that when a unit breaks down it can be removed from the vehicle body to permit a spare unit to be installed. Thus, costly tie-ups of trailer equipment while waiting for service of the air conditioning apparatus is eliminated. Likewise, a broken unit may be returned to the factory for repairs which in most cases would be cheaper for the customer than to have it serviced in the field by local refrigeration service companies. If a customer does not have to use the unit for heating the interior of the trailer during the winter months it may be removed and stored so that wear on the unit may be eliminated and the space within the trailer occupied by the unit may then be occupied by additional pay loads. Moreover, the present construction eliminates the necessity of cutting large openings or holes in the walls of the trailer which otherwise might mar the appearance thereof. Actually, the present unit will take up less pay load space than ice bunkers, ice barrels and charcoal heaters heretofore employed for cooling or heating the interior of such vehicles. The unit design will also assure ample protection from the weather elements, dirt and grit. Thus, premature wear and tear on the belts, bearings, and other vital parts of the apparatus is eliminated.

What I claim as my invention is:

1. Air conditioning apparatus for a closed cargo carrying vehicle comprising a self-contained portable unit adapted to be completely installed within a vehicle of the type mentioned and having a housing provided with a bottom wall adapted to rest upon a bottom wall of the vehicle, said housing having openings in its bottom wall, wheeled supports for the unit adapted to be projected through said openings into operative engagement with the bottom wall of the vehicle, and means adjustable relative to the housing for projecting said supports through said openings into operative engagement with the bottom wall of the vehicle.

2. Air conditioning apparatus for a closed cargo carrying vehicle comprising a self-contained portable unit adapted to be completely installed within a vehicle of the type mentioned and having a housing provided with a bottom wall adapted to rest upon a bottom wall of the vehicle, said housing having openings in its bottom wall through which wheeled supports for the unit may be projected into operative engagement with the bottom wall of the vehicle.

3. Air conditioning apparatus for a closed cargo carrying vehicle comprising a self-contained portable unit adapted to be completely installed within a vehicle of the type mentioned and having a housing provided with a bottom wall adapted to rest upon a bottom wall of the vehicle, wheeled supports for the unit adjustable through openings in the bottom wall of the housing into operative engagement with the bottom wall of the vehicle, and means carried by the housing for adjusting the supports through the openings into engagement with the bottom wall of the vehicle when it is desired to move the unit relative to the vehicle, said means being also adapted to move the supports to an inoperative position relative to the bottom wall of the vehicle to permit the bottom wall of the housing to rest upon the bottom wall of the vehicle when the unit reaches an operative position of installation within the vehicle.

4. Air conditioning apparatus for a closed cargo carrying vehicle comprising a self-contained portable unit adapted to be completely installed within a vehicle of the type mentioned and having a housing adapted to be nested in surface to surface engagement with upright and bottom walls of the vehicle, means within and on top of the housing for conditioning the air within said vehicle, the housing having a bottom wall provided with openings, supporting wheels for the unit adapted to be projected through said openings for engagement with the bottom wall of the vehicle, and means carried by the housing and accessible at the top thereof for projecting the wheels through said openings into engagement with the bottom wall of the vehicle whereby the unit may be raised from and rolled over said bottom wall of the vehicle.

5. Air conditioning apparatus for a closed cargo carrying vehicle comprising a self-contained portable unit adapted to be completely installed within a vehicle of the type mentioned and having a housing adapted to be nested in surface to surface engagement with upright and bottom walls of the vehicle, the housing having a bottom wall provided with openings, supporting wheels for the unit adapted to be projected through said openings for engagement with the bottom wall of the vehicle, and means carried by the housing and accessible at the top thereof for projecting the wheels through said openings into engagement with the bottom wall of the vehicle whereby the unit may be raised from and rolled over said bottom wall of the vehicle.

6. Air conditioning apparatus for a closed cargo carrying vehicle, comprising a self-contained portable unit adapted to be removably installed within a vehicle of the type mentioned and having a housing, and air conditioning apparatus carried in its entirety by said housing, portions respectively of said apparatus being within and outside said housing, said housing and apparatus carried thereby being adapted to be raised and lowered as a unit relative to the floor of the vehicle, said housing having one or more openings adapted when the unit is lowered to register with a corresponding number of openings in the vehicle, and means also carried by said housing for raising and lowering the unit relative to the floor of the vehicle, a part of said raising and lowering means being operable when the housing is raised to transport the unit over the floor of the vehicle.

7. Air conditioning apparatus for a closed cargo carrying vehicle, comprising a self-contained portable unit adapted to be removably installed within a vehicle of the type mentioned and having a housing, and air conditioning apparatus carried in its entirety by said housing, said housing and apparatus carried thereby being adapted to be raised and lowered as a unit relative to the floor of the vehicle, said housing having a bottom wall adapted to rest upon the floor of the vehicle when the unit is lowered, said bottom wall having one or more openings registerable with a corresponding number of openings in the floor of the vehicle when the unit is lowered to permit circulation of air from the atmosphere to the interior of the housing, and means connected to the housing and engageable with the vehicle for raising and lowering the housing and apparatus carried thereby.

8. Air conditioning apparatus for a closed cargo carrying vehicle, comprising a self-contained portable unit adapted to be removably installed within a vehicle of the type mentioned and having a housing, and air conditioning apparatus carried in its entirety by said housing, said housing and apparatus carried thereby being adapted to be raised and lowered as a unit relative to the floor of the vehicle, said housing having upright and bottom walls provided with openings for registration with openings in the upright and bottom walls of the vehicle when said unit is lowered, and means connected to the housing and engageable with the vehicle for raising and lowering the housing and apparatus carried thereby.

9. Air conditioning apparatus for a closed cargo carrying vehicle, comprising a self-contained portable unit adapted to be removably installed within a vehicle of the type mentioned and having a housing, and air conditioning apparatus carried in its entirety by said housing, said housing being adapted to rest upon the floor of the vehicle, portions respectively of said apparatus being within and outside said housing, said housing having one or more openings adapted to register with a corresponding number of openings in the vehicle when the housing rests upon the floor of the vehicle to permit circulation of air from the atmosphere to the interior of said housing to cool the portion aforesaid of the air conditioning apparatus within said housing, and means also carried by said housing and engageable with the floor of the vehicle to raise and lower the housing and air conditioning apparatus carried thereby, whereby such housing and apparatus as a unit may either be elevated for movement over the floor of the vehicle or may be lowered so that the housing may rest upon the floor of the vehicle and thereby cause the openings in said housing to register with the openings in the vehicle, as aforesaid.

10. Air conditioning apparatus for a closed cargo carrying vehicle comprising a self-contained portable unit adapted to be removably installed within a vehicle of the type mentioned and having a housing, and air conditioning apparatus carried in its entirety by said housing, portions respectively of said apparatus being within and outside said housing, said housing and apparatus carried thereby being adapted to be raised and lowered as a unit from and to nested relation with upright and bottom walls of the vehicle, means carried by the housing for raising and lowering the unit relative to the bottom wall of the vehicle, a part of said means being operable when the unit is raised to transport the unit over the bottom wall of the vehicle, said housing having openings adapted when the unit is lowered to register with openings in the bottom and upright walls of the vehicle, whereby air from the atmosphere may be received in and discharged from the housing, and a portion of said air conditioning apparatus within the housing may be accessible to be serviced from the outside of the vehicle.

11. Air conditioning apparatus for a closed cargo carrying vehicle comprising a self-contained portable unit adapted to be removably installed within a vehicle of the type mentioned and having a housing, and air conditioning apparatus carried in its entirety by said housing, said housing and apparatus carried thereby being adapted to be raised and lowered as a unit from and to nested relation with upright and bottom walls of the vehicle, means carried by the housing for raising and lowering the unit relative to the bottom wall of the vehicle, a part of said means being operable when the unit is raised to transport the unit over the bottom wall of the vehicle, said housing having openings adapted when the unit is lowered to register with openings in the bottom wall of the vehicle, whereby air from the atmosphere may be received in and discharged from the housing.

12. Air conditioning apparatus for a closed cargo carrying vehicle, comprising a self-contained portable unit adapted to be removably installed within a vehicle of the type mentioned and having a housing, and air conditioning apparatus carried in its entirety by said housing, said housing and apparatus carried thereby being adapted to be raised and lowered as a unit from and to nested relation with upright and bottom walls of the vehicle, means carried by the housing for raising and lowering the unit relative to the bottom wall of the vehicle, a part of said means being operable when the unit is raised to transport the unit over the bottom wall of the vehicle, said housing having an opening adapted when the unit is lowered to register with an opening in an upright wall of the vehicle so that a portion of said air conditioning apparatus within the housing may be accessible to be serviced from the outside of the vehicle.

13. Air conditioning apparatus for a closed cargo carrying vehicle comprising a self-contained portable unit adapted to be removably installed within a vehicle of the type mentioned and having a housing, and air conditioning apparatus carried in its entirety by said housing, said housing and apparatus carried thereby being adapted to be raised and lowered relative to the bottom wall of the vehicle, said housing being provided with a bottom wall adapted to rest upon the bottom wall of the vehicle, said bottom wall of the housing having openings, one or more of said openings being adapted when the unit is lowered to register with a corresponding number of openings in the bottom wall of the vehicle, and wheeled supports for the unit adjustable through other of the openings in the bottom wall of the housing into operative engagement with the bottom wall of the vehicle so that the unit may be raised relative to and moved over the bottom wall of the vehicle, and means carried by the housing and accessible above the top wall thereof for adjusting said supports through said openings into operative engagement with the bottom wall of the vehicle.

14. Air conditioning apparatus for a closed cargo carrying vehicle comprising a self-contained portable unit adapted to be removably installed within a vehicle of the type mentioned and having a housing, and air conditioning apparatus carried in its entirety by said housing, said housing and apparatus carried thereby being adapted to be raised and lowered from and to nested relation with upright and bottom walls of the vehicle, the housing having a bottom wall provided with openings, certain of said openings being adapted when the unit is lowered to register with openings in the bottom wall of the vehicle to permit air from the atmosphere to enter the housing to cool the interior thereof, and wheeled supports for the unit adjustable through other of said openings in the bottom wall of the housing into operative engagement with the bottom wall of the vehicle so that the unit may be raised relative to the bottom wall of the vehicle when it is desired to remove the unit.

15. Air conditioning apparatus for a closed cargo carrying vehicle having a floor and upright walls, comprising a self-contained portable unit adapted to be removably installed completely within a vehicle of the type mentioned, said portable unit having air conditioning apparatus and a support therefor, said apparatus and support being entirely separate from the vehicle and adapted to be raised and lowered as a unit relative to the floor of the vehicle, said air conditioning apparatus being carried in its entirety by said support, said support being provided at the bottom thereof with an opening adapted to register with an opening in the floor of the vehicle when the unit is lowered onto said floor, whereby air from the atmosphere outside the vehicle may circulate to and from the air conditioning apparatus of the portable unit within the vehicle, said support being provided at the front thereof with an opening adapted to register with an opening in one of the upright walls of the vehicle when the unit is lowered onto said floor, whereby a portion of said air conditioning apparatus within the vehicle may be accessible to be serviced from the outside of the vehicle.

16. Air conditioning apparatus for a closed cargo carrying vehicle having a floor, comprising a self-contained portable unit adapted to be removably installed completely within a vehicle of the type mentioned, said portable unit having air conditioning apparatus and a support therefor, said apparatus and support being entirely separate from the vehicle and adapted to be raised and lowered as a unit relative to the floor of the vehicle, said air conditioning apparatus being carried in its entirety by said support, said support being provided at the front thereof with an opening adapted to register with an opening in one of the upright walls of the vehicle when the unit is lowered onto said floor, whereby a portion of said air conditioning apparatus within the vehicle may be accessible to be serviced from the outside of the vehicle.

17. Air conditioning apparatus for a closed cargo carrying vehicle having a floor, comprising a self-contained portable unit adapted to be removably installed entirely within a vehicle of the type mentioned, said portable unit having air conditioning apparatus and a support therefor, said apparatus and support being entirely separate from the vehicle and adapted to be raised and lowered as a unit relative to the floor of the vehicle, said air conditioning apparatus being carried in its entirety by said support, said support being provided at the bottom thereof with an opening adapted to register with an opening in the floor of the vehicle when the unit is lowered onto said floor, whereby air from the atmosphere outside the vehicle may circulate to and from the air conditioning apparatus of the portable unit within said vehicle.

HENRY O. KIRKPATRICK.